(12) United States Patent
Fellmann et al.

(10) Patent No.: US 11,977,582 B2
(45) Date of Patent: May 7, 2024

(54) GLOBAL INDEX WITH REPARTITIONING OPERATOR

(71) Applicant: SAP SE, Walldorf (DE)

(72) Inventors: Joerg Fellmann, Nussloch (DE); Till Merker, Sandhausen (DE); Paul Willems, Heidelberg (DE); Dan Bi Park, Seoul (KR); Heesik Shin, Seoul (KR); Jin Su Lee, Seoul (KR); Myunggu Kang, Seoul (KR)

(73) Assignee: SAP SE, Walldorf (DE)

( * ) Notice: Subject to any disclaimer, the term of this patent is extended or adjusted under 35 U.S.C. 154(b) by 51 days.

(21) Appl. No.: 17/741,328

(22) Filed: May 10, 2022

(65) Prior Publication Data

US 2023/0367819 A1    Nov. 16, 2023

(51) Int. Cl.
*G06F 16/90* (2019.01)
*G06F 16/903* (2019.01)

(52) U.S. Cl.
CPC .............. *G06F 16/90335* (2019.01)

(58) Field of Classification Search
CPC ............ G06F 16/90335; G06F 16/24554
See application file for complete search history.

(56) References Cited

U.S. PATENT DOCUMENTS

2020/0320051 A1* 10/2020 Lee .................. G06F 16/278
2021/0374138 A1* 12/2021 Delbru ............ G06F 16/24544

* cited by examiner

*Primary Examiner* — Etienne P Leroux
*Assistant Examiner* — Cindy Nguyen
(74) *Attorney, Agent, or Firm* — Mintz Levin Cohn Ferris Glovsky and Popeo, P.C.

(57) ABSTRACT

A global index with a repartitioning operator is provided. A method for executing a query includes receiving a query including a request to search a first table based on a first value in a first column. The method may include generating a second table by partitioning the second table based on the first column and including, in the second table, a partition identifier and a reference row identifier. The method may include pruning the second table such that a row corresponding to the first value remains in the second table. The method may include repartitioning the row to a stream based on the partition identifier. The method may include executing the query by at least searching the partition of the first table based on the stream and the row identifier of the row. Related systems and articles of manufacture are provided.

20 Claims, 9 Drawing Sheets

GLOBAL INDEX WITH REPARTITIONING OPERATOR

TECHNICAL FIELD

The subject matter described herein relates generally to database management and more specifically to a global index with a repartitioning operator.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for a global index with repartitioning operator. In one aspect, there is provided a system. The system may include at least one data processor and at least one memory. The at least one memory may store instructions that result in operations when executed by the at least one data processor. The operations may include: receiving a query including a request to search a first table based on a first value in a first column of a plurality of columns. The first table includes: the plurality of columns, a plurality of rows, a plurality of partitions partitioned based on a second column of the plurality of columns, and a row identifier identifying each row of the plurality of rows. The operations include generating, based on the first table, a second table. The generating may include partitioning the second table based on the first column and including, in the second table, a partition identifier and a reference row identifier. The partition identifier identifies a partition of the plurality of partitions of the first table in which the first value is located, and the reference row identifier corresponds to the row identifier. The operations may include pruning the second table such that a row corresponding to the first value remains in the second table. The operations may include repartitioning the row to a stream based on the partition identifier in the row corresponding to the first value remaining in the second table after the pruning. The operations may include executing the query. Executing the query may include searching the partition of the first table based on the stream and the row identifier of the row.

In some variations, the plurality of partitions includes the partition and a second partition. The executing includes searching only the partition of the first table in which the first value is located.

In some variations, the operations further include: joining, after the repartitioning, the row on the stream and the partition of the first table in which the first value is located.

In some variations, the joining is performed using a semi-join operator.

In some variations, the first table is a source table and the second table is an asymmetric replica of the first table.

In some variations, the query further includes the request to search the first table based on a second value in the first column of the plurality of columns.

In some variations, the generating further includes: including, in the second table, a second partition identifier and a second reference row identifier. The second partition identifier indicates a second partition of the plurality of partitions of the first table in which the second value is located. The second reference row identifier corresponds to the row identifier of a second row in which the second value is located. The second table is further pruned such that the row and the second row remains in the second table.

In some variations, the second row is repartitioned to a second stream based on the second partition identifier. The second row on the second stream is joined, after the second row is repartitioned to the second stream, to the second partition of the plurality of partitions of the first table. The executing includes searching only the partition of the first table in which the first value is located and the second partition of the first table in which the second value is located.

In some variations, the second column is a partitioning key.

A computer-implemented method may include: receiving a query including a request to search a first table based on a first value in a first column of a plurality of columns. The first table includes: the plurality of columns, a plurality of rows, a plurality of partitions partitioned based on a second column of the plurality of columns, and a row identifier identifying each row of the plurality of rows. The method includes generating, based on the first table, a second table. The generating may include partitioning the second table based on the first column and including, in the second table, a partition identifier and a reference row identifier. The partition identifier identifies a partition of the plurality of partitions of the first table in which the first value is located, and the reference row identifier corresponds to the row identifier. The method may include pruning the second table such that a row corresponding to the first value remains in the second table. The method may include repartitioning the row to a stream based on the partition identifier in the row corresponding to the first value remaining in the second table after the pruning. The method may include executing the query. Executing the query may include searching the partition of the first table based on the stream and the row identifier of the row.

A non-transitory computer-readable medium storing instructions, which when executed by at least one data processor, result in operations including: receiving a query including a request to search a first table based on a first value in a first column of a plurality of columns. The first table includes: the plurality of columns, a plurality of rows, a plurality of partitions partitioned based on a second column of the plurality of columns, and a row identifier identifying each row of the plurality of rows. The operations include generating, based on the first table, a second table. The generating may include partitioning the second table based on the first column and including, in the second table, a partition identifier and a reference row identifier. The partition identifier identifies a partition of the plurality of partitions of the first table in which the first value is located, and the reference row identifier corresponds to the row identifier. The operations may include pruning the second table such that a row corresponding to the first value remains in the second table. The operations may include repartitioning the row to a stream based on the partition identifier in the row corresponding to the first value remaining in the second table after the pruning. The operations may include executing the query. Executing the query may include searching the partition of the first table based on the stream and the row identifier of the row.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
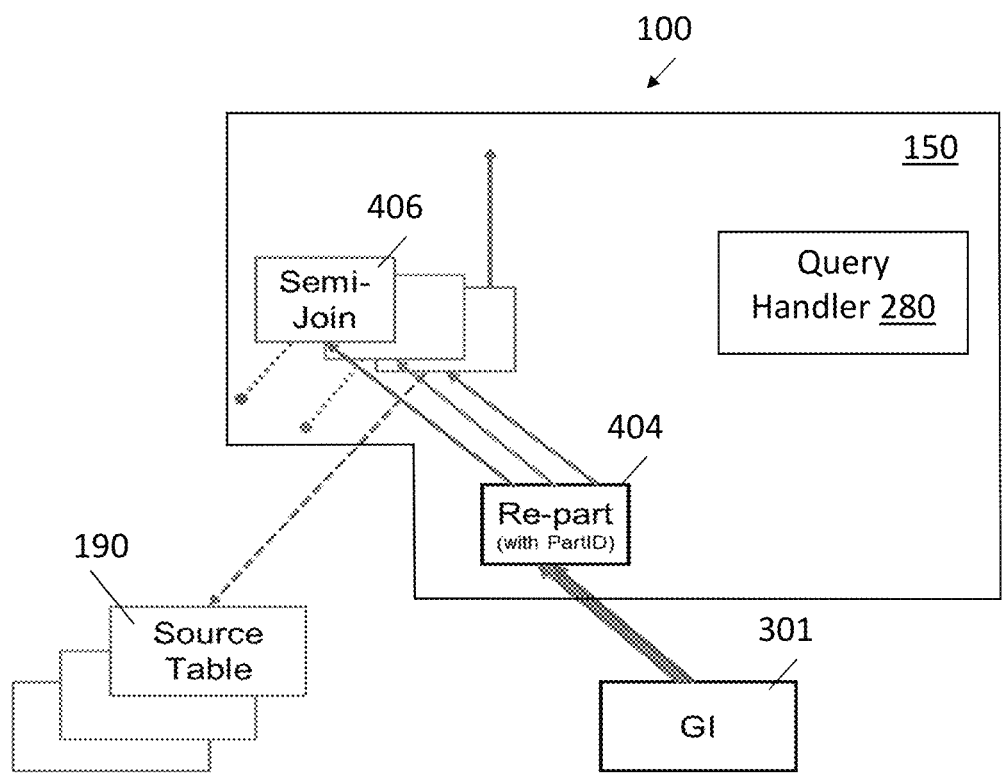
FIG. 1 depicts a system diagram illustrating a system, in accordance with some example embodiments.

Database management systems and operations performed on the data managed by a database management system have become increasingly complex. For example, a database management system (or database for short) can support relatively complex online analytical processing (OLAP, which can perform multi-dimensional analysis) to more straightforward transaction based online transaction processing (OLTP). Moreover, the database may be configured as a row-store database or column-store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

Database management systems, such as distributed database systems can be used to store and manage a large amount of data. In order to handle the large amounts of data and/or to distribute the data on different nodes, the data can be stored in partitioned source tables. The partitioned source tables can be partitioned based on a partitioning key to distribute the data. Thus, the data can be distributed across various partitions based on the partitioning key, which corresponds to a column of the source table that determines the partition in which the data is stored.

Generally, queries to search the partitioned source table can be quickly and efficiently handled when the query includes a filter based on the partitioning key. For example, when the query includes the filter based on the partitioning key, a query handler can use the partitioning key to determine which partitions are relevant for searching. However, when queries include a filter based on a column or a value stored in a column that is not the partitioning key, the query handler is not able to use the partitioning key to determine where to locate the requested data. As a result, query handlers would need to search all partitions for the requested data. This process would be computationally inefficient, particularly when there are a large number (e.g., tens, hundreds, or more) of partitions.

In some instances, to efficiently handle queries that include a request to filter a source table based on a column or a value stored in a column that is not the partitioning key, a global index may be used. A global index spans data in one or more partitions that are not equipartitioned with the source table. Global indexes can be used to partition the source table based on the column or value stored in the column that is not the partitioning key. As a result, global indexes can be used as an asymmetric replica of the source table that refers back to and is communicatively coupled to the source table, but is partitioned based on a column or value that is not the partitioning key of the source table. While global indexes can generally be used in such circumstances, global indexes are not available in all execution engines, such as in the SAP HANA execution (HEX) engine. For example, global indexes can require execution engines to include a particular infrastructure that supports partitioned global indexes. Without the supporting infrastructure, execution engines would not be able to take advantage of the global indexes by quickly searching partitions of the global index and referencing back to the source table.

The database management system consistent with example embodiments of the current subject matter includes a global index with a repartitioning operator that allows for use of a global index with a repartitioning operator to communicate with the source table. The global index with the repartitioning operator described herein includes a modified global index that allows for execution engines that would not otherwise support global indexes to take advantage of various aspects of the global index, while still allowing for the source table to quickly and efficiently be referenced during execution of a query including a filter based on a value or column that is not the partitioning key of the source table. In the database management system described herein, the query can be processed by generating a global index, filtering on the global index, and repartitioning based on the global index in a way that joins the global index back to the source table and allows for searching the source table without accessing partitions of the source table that are not relevant for executing the query. Accordingly, the modified global index consistent with embodiments of the current subject matter can be used to efficiently and quickly handle queries, such as in execution engines that do not support global indexes directly referencing back to the source table. Additionally and/or alternatively, the database management system described herein may not call other database servers where no relevant partitions are located. This may help to further improve computing efficiency and query processing speed.

FIG. 1 is a block diagram showing a query plan for execution by a database management system 100, in accordance with some example embodiments. The database management system 100 may include an execution engine 150 that may be configured to receive a query, generate a query plan (including for example query algebra), optimize the query plan, and/or generate executable code, as discussed herein, and discussed in more detail with respect to FIG. 9. The database management system 100 may also include a query handler 280 that performs one more operations of a query, such as before or during execution of a query execution plan. The query handler 280 (which may comprise pre-compiled code and/or generated executable code) may define an application that is part of or separate from the execution engine 150 that handles processing of the query.

Referring to FIG. 1, the execution engine 150 may include a repartitioning operator 404 and a join operator 406. The database management system 100 may include a source table 190 (also described herein as databases 190A-N) and a global index operator 301. The global index operator 301 may be a table scan operator. The execution engine 150 may communicate with the execution engine 150, such as via the query handler 280 of the execution engine 150. The query handler 280 may communicate with and/or include the repartitioning operator 404 and/or the join operator 406. For example, the query handler 280 may process a query received by the execution engine 150 using the global index operator 301, the repartitioning operator 404, the join operator 406, and/or a source table 201 on database 190.

Figure 2:
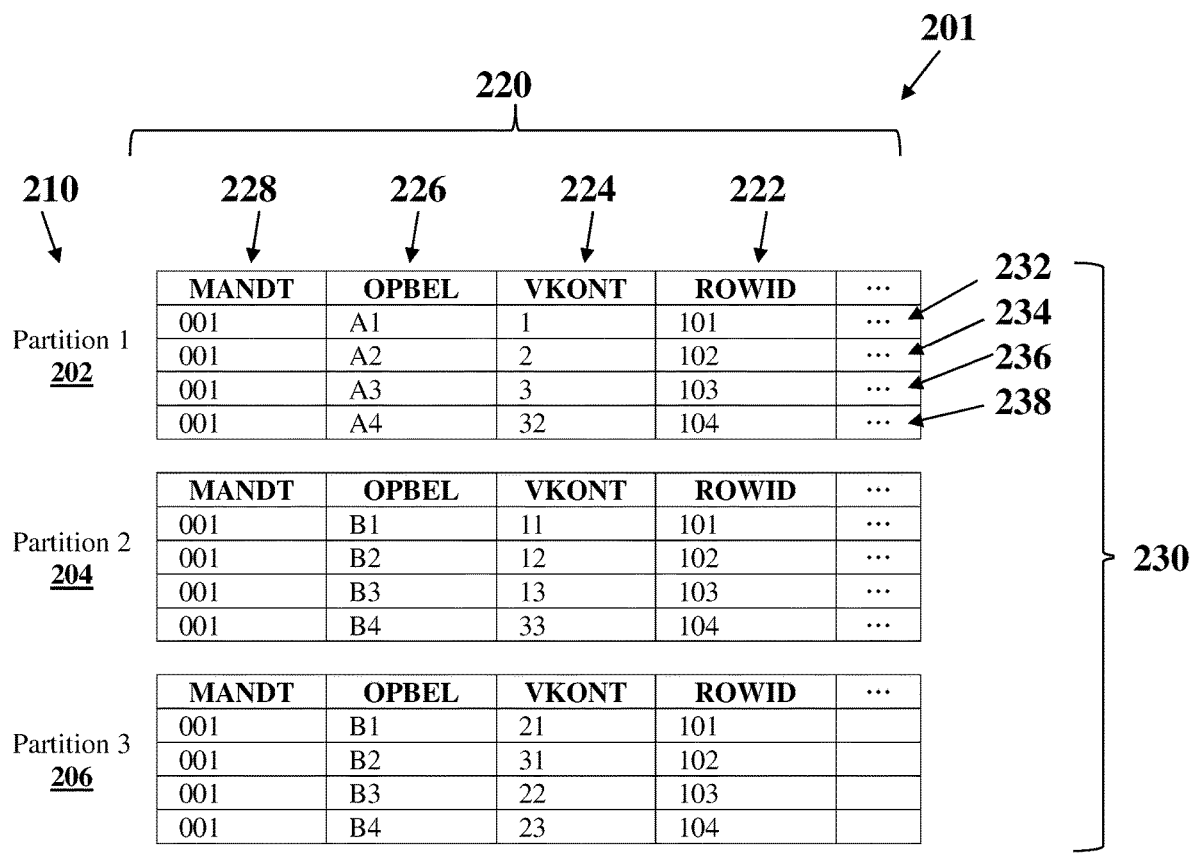
FIG. 2 depicts an example partitioned source table, in accordance with some example embodiments.

FIG. 2 illustrates an example of the source table 201. The source table 201 may be partitioned into a plurality of partitions 210. The plurality of partitions 210 includes a first partition 202, a second partition 204, a third partition 206 and so on. It should be appreciated that while three partitions are shown in the source table 201, the source table 201 may include any number of partitions. The source table 201 may include a plurality of columns 220 and a plurality of rows 230. As an example, the plurality of columns includes a first column 228, a second column 226, a third column 224, a fourth column 222, and so on. In this example, the first column 228 is labeled "MANDT," the second column 226 is labeled "OPBEL," the third column 224 is labeled "VKONT," and the fourth column 222 is labeled "ROWID." In this example, the partitioning key is the second column 226. In other words, the source table 201 is partitioned into the first partition 202, the second partition 204, and the third partition 206 based on the second column 226 labeled "OPBEL." The plurality of rows 230 includes a first row 232, a second row 234, a third row 236, a fourth row 238, and so on. As shown in FIG. 2, the plurality of partitions 210 each include the plurality of rows 230. The fourth column 222 labeled "ROWID" includes a row identifier associated with and/or identifying each row of the plurality of rows 230 of each of the plurality of partitions 210. In some embodiments, the row identifier associated with each row is different for each row in a particular partition. However rows in different partitions may have the same row identifier. It should be appreciated that the plurality of columns 220 and the plurality of rows 230 may be included in the source table 201 in a different order than the example shown in FIG. 2.

Figure 9:
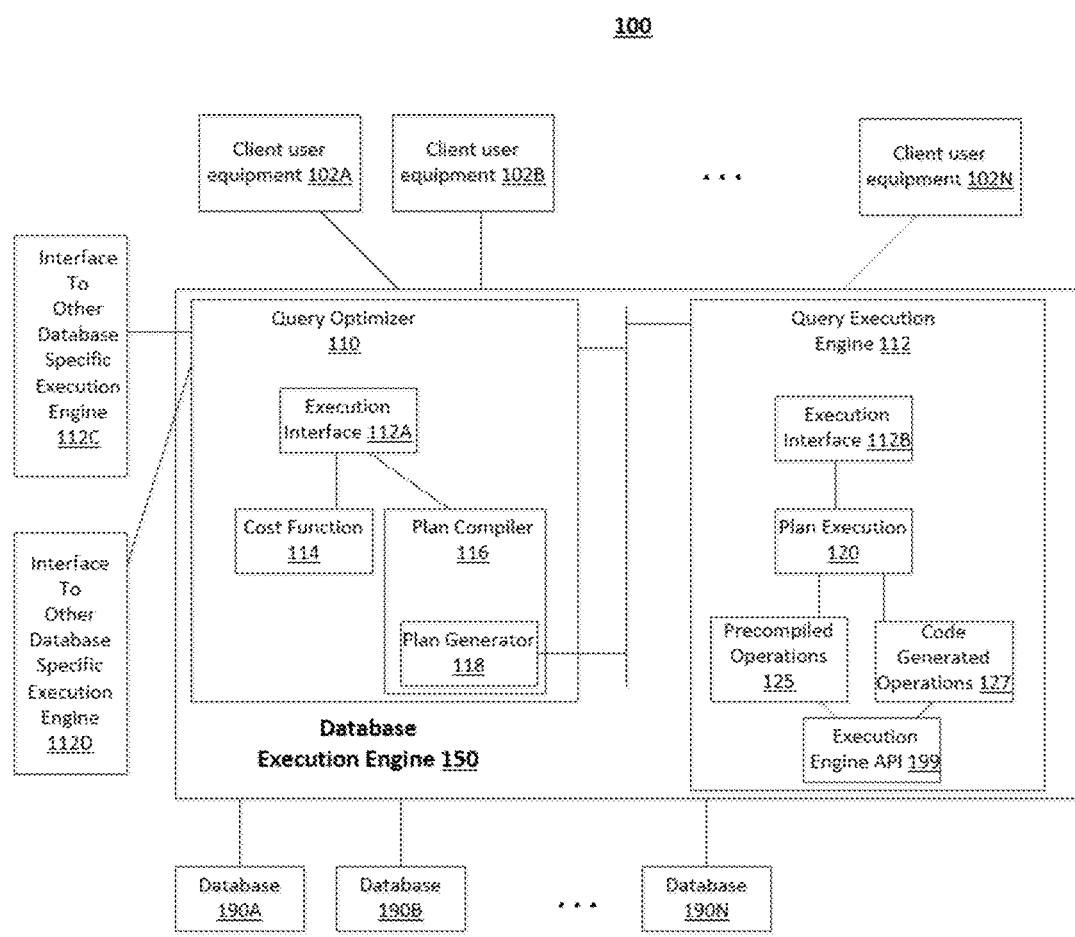
FIG. 9 depicts another block diagram for a system, in accordance with some example embodiments.

Consistent with embodiments of the current subject matter, the execution engine 150 may receive a query, such as via client user equipment (see FIG. 9). The query may include query criteria. The query criteria may include a request to search the source table 201 that has been partitioned based on the partitioning key (e.g., the second column 226). In some embodiments, the query criteria may specify that the request to search the source table 201 is based on at least one value or column (e.g., the first column 228, the third column 224, the fourth column 222, or the like, and/or a value contained in the first column 228, the third column 224, and/or the fourth column 222) that is not the partitioning key. The at least one value or column may include one, two, three, four, five, ten, twenty, one hundred, or more values or columns. In some implementations, the query criteria specifies which column or columns to search for one or more particular values. The one or more values may not be contained in the column or columns specified in the query criteria.

As an example and referring to the source table shown in FIG. 2, a query may include: SELECT*FROM "DFKKOP" WHERE VKONT='11' OR VKONT='21'. In this query, the query criteria includes a request to select (e.g., search and/or filter), from table DFKKOP (e.g., the source table 201), based on two values stored in the third column 224 labeled VKONT. However, as noted above, the source table 201 is partitioned based on the second column 226 labeled OPBEL. Since the source table 201 is partitioned based on the second column 226 rather than the third column 224, the query handler 280 may not process the query by directly searching the source table 201 by filtering the source table 201 based on the third column 224.

To process the query, the query handler 280 may implement the global index with repartitioning operator as described herein. For example, as shown in FIG. 1, the query handler 280 or another component of the execution engine 150 may generate an asymmetric replica (see FIG. 3) of the source table 201 using the global index operator 301, prune the asymmetric replica, repartition the pruned asymmetric replica to a stream, and/or join the repartitioned and pruned asymmetric replica on the stream and a relevant partition of the source table 201.

As described above, the query handler 280 may generate an asymmetric replica 300 of the source table 201. The asymmetric replica 300 may represent a global index to be repartitioned by the query handler 280. The asymmetric replica 300 is a table or index that is an asymmetric replica of the source table 201 that has been partitioned based on a value or column that is not the same as the partitioning key of the source table 201. For example, an asymmetric replica may include a replica of a table or partitioned index that has been replicated in such a way that the replica has a different partitioning specification than the source table. In other words, the partitions of the source table can be replicated to the asymmetric replica, which may use hash partitioning on the basis of a different value or partitioning key. The asymmetric replica may be given a unique name so that queries can be specifically targeted to the asymmetric replica. The asymmetric replica may be generated on the fly during query execution. Additionally and/or alternatively, the asymmetric replica is generated prior to execution of the query and/or query plan. In other words, while use of the asymmetric replica may be part of the query plan, the generation of the asymmetric replica may be performed prior to execution of the query.

Figure 3:
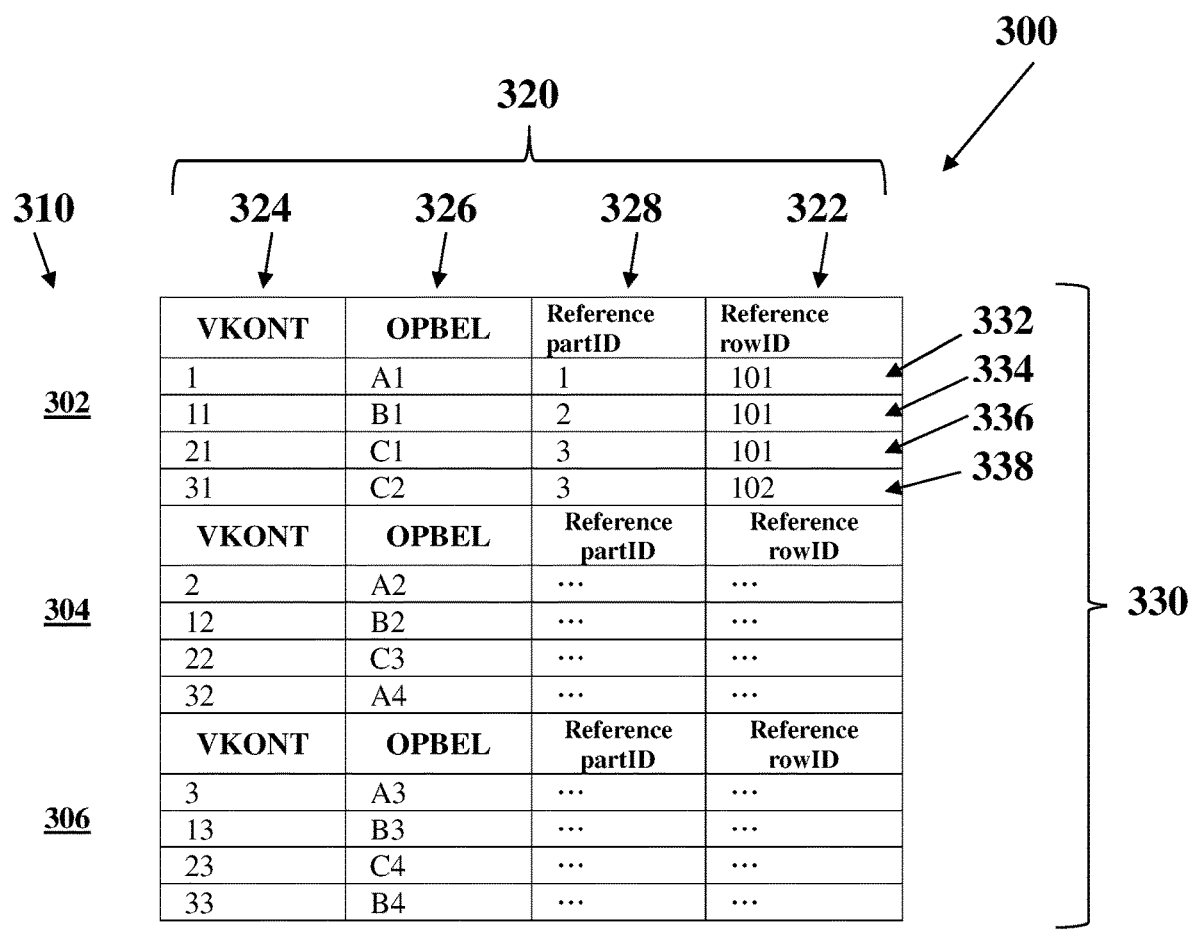
FIG. 3 depicts an example global index, in accordance with some example embodiments.

FIG. 3 illustrates an example of the asymmetric replica 300 according to some example embodiments. Referring to FIG. 3, the asymmetric replica 300 may be partitioned into a plurality of partitions 310. The plurality of partitions 310 includes a first partition 302, a second partition 304, a third partition 306 and so on. It should be appreciated that while three partitions are shown in the asymmetric replica 300, the asymmetric replica 300 may include any number of partitions.

The asymmetric replica 300 may include a plurality of columns 320 and a plurality of rows 330. As an example, the plurality of columns includes a first column 324, a second column 326, a third column 328, a fourth column 322, and so on. In this example, the first column 324 is labeled "VKONT" and includes the same values as the third column 224 of the source table 201. In this example, the asymmetric replica 300 has been partitioned based on the first column 324 because the values requested in the query criteria were stored in the third column 224 of the source table 201. The second column 326 is labeled "OPBEL" and includes the same values as the second column 226 of the source table 201. The third column 328 is labeled "Reference partId" and includes a reference partition identifier corresponding to a partition in the source table 201. The reference partition identifier identifies the partition of the plurality of partitions 210 from the source table 201 in which the corresponding row is stored. In some embodiments, the reference partition identifier identifies the partition of the plurality of partitions 210 of the source table 201 in which the at least one value included in the query criteria is stored. The fourth column 322 is labeled "Reference rowId" and includes a reference row identifier corresponding to the row identifier included in the fourth column 222. In some instances, the asymmetric replica 300 may not include all columns of the source table 201. Instead, the asymmetric replica 300 may include only a selection of the columns in the source table 201.

The plurality of rows 330 includes a first row 332, a second row 334, a third row 336, a fourth row 338, and so on. As shown in FIG. 3, the plurality of partitions 310 each include the plurality of rows 330. Further, as shown in FIG. 3, multiple rows from each partition of the plurality of partitions 310 of the asymmetric replica 300 may have the same reference row identifier and/or a different reference row identifier because the rows correspond to rows stored in different partitions in the source table 201. It should be appreciated that the plurality of columns 320 and the plurality of rows 330 may be included in the asymmetric replica 300 in a different order than the example shown in FIG. 3.

In some embodiments, the query handler 280 may generate the asymmetric replica 300 based on the source table 201. For example, as described herein, the query handler 280 may partition the asymmetric replica 300 based on the first column 324, which corresponds to the third column 224 referenced in the query criteria of the query. In implementations in which the asymmetric replica 300 is generated prior to receiving the query, the asymmetric replica 300 may be generated based on one or more of the columns of the source table 201 in preparation for receiving the query. The query handler 280 may include, in the asymmetric replica 300, a partition identifier (e.g., the reference partition identifier) that identifies a partition of the plurality of partitions 210 of the source table 201 in which the at least one value of the query criteria is located. The query handler 280 additionally and/or alternatively includes, in the asymmetric replica 300, the reference row identifier (e.g., the fourth column 322), which corresponds to the row identifier (e.g., the fourth column 222) of the source table 201. Thus, the query handler 280 includes identifiers in the asymmetric replica 300 that refer back to locations of stored values in the source table 201.

Referring to the example query described above, the asymmetric replica 300 was generated to include a reference row identifier of 101 and a reference partition identifier of 2 corresponding to the value VKONT=11 included in the query criteria and a reference row identifier of 101 and a reference partition identifier of 3 corresponding to the value VKONT=21 included in the query criteria. This indicates that the value VKONT=11 is stored in row 101 of the second partition of the source table 201 and the value VKONT=21 is stored in row 101 of the third partition of the source table 201. While the example query criteria includes a request to filter based on a single value "VKONT", the database management system 100 consistent with embodiments of the current subject matter may process queries including requests to filter based on multiple columns. In such instances, the query handler may generate multiple asymmetric replicas corresponding to each of the values.

Figure 4:
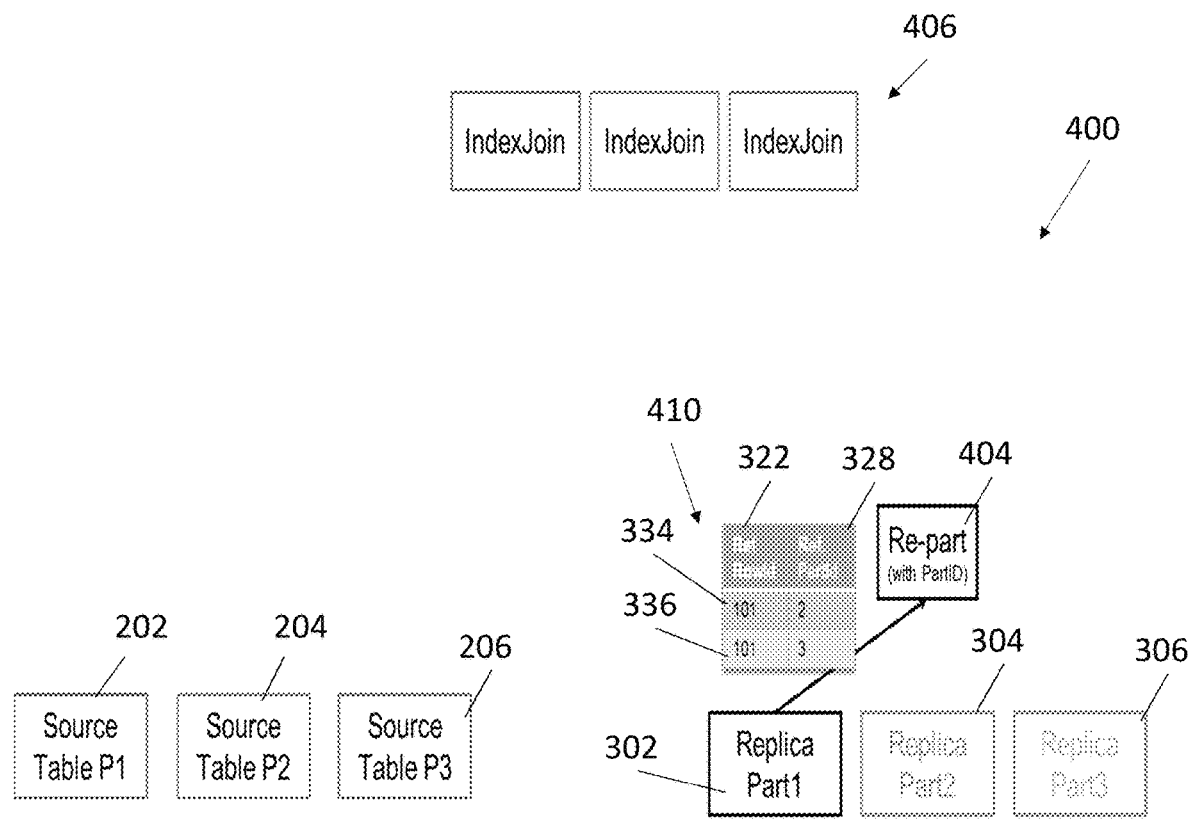
FIG. 4 depicts an example workflow for implementing a global index with a repartitioning operator, in accordance with some example embodiments.

FIG. 4 illustrates at least a part of a workflow 400 for processing the query by the query handler 280 according to example embodiments. As shown in FIG. 4, the query handler 280 may prune the asymmetric replica 300. The asymmetric replica 300 may be pruned such that at least one row of the plurality of rows 330 corresponding to the at least one value included in the query criteria remains in the asymmetric replica 300. In other words, the asymmetric replica 300 can be pruned by removing the rows and/or columns that do not correspond to the rows and/or columns of the values indicated in the query criteria.

As an example using the query described above, the asymmetric replica 300 can be pruned to generate a pruned table 410. The pruned table 410 includes only the rows corresponding to each of the values included in the query criteria. The pruned table 410 may additionally or alternatively include only the fourth column 322 corresponding to the reference row identifier and the third column 328 corresponding to the reference partition identifier associated with the values included in the query criteria. Referring to the example query described above, the pruned table 410 includes only the reference row identifier and the reference partition identifier corresponding to each of the values VKONT=11 and VKONT=21. Pruning the asymmetric replica 300 allows for only the relevant partitions of the source table 201 to be accessed after repartitioning. In some embodiments, the pruned table 410 filtered for one or more values, such as those indicated in the query criteria, to locate the correct rows.

Figure 5:
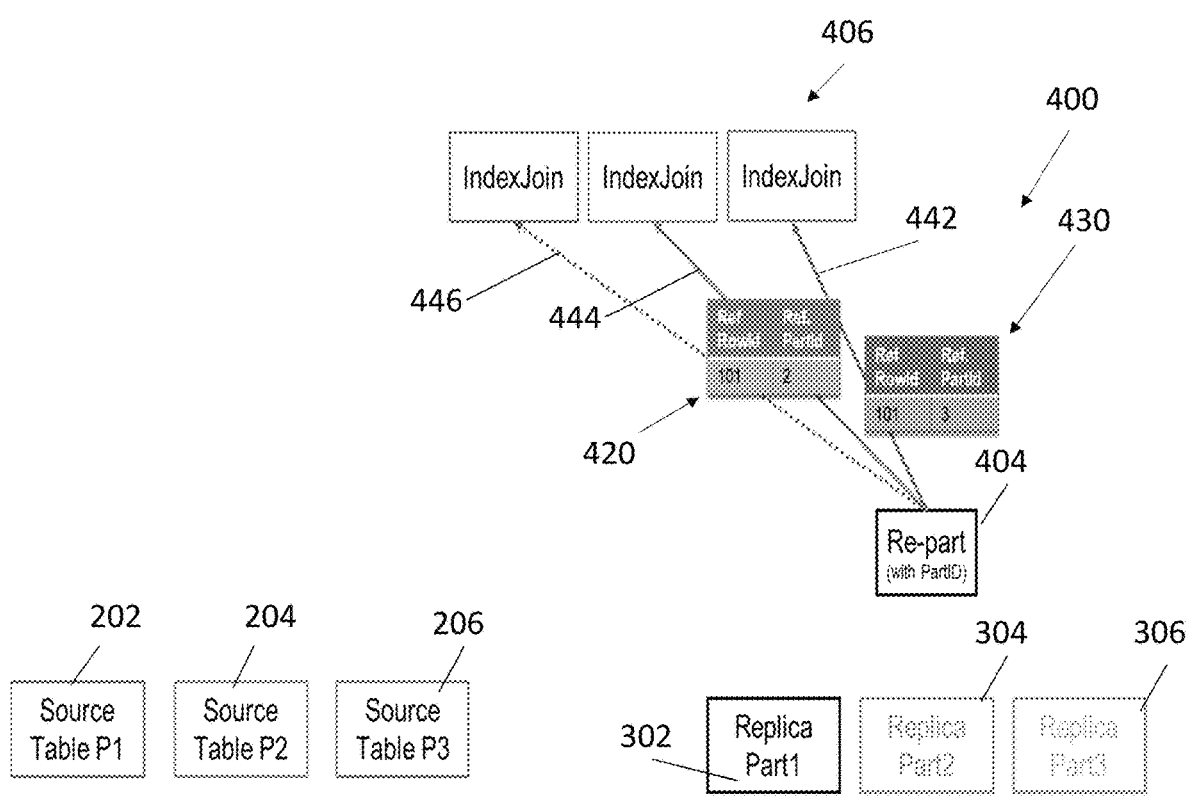
FIG. 5 depicts an example workflow for implementing a global index with a repartitioning operator, in accordance with some example embodiments.

FIG. 5 illustrates at least a part of the workflow 400 for processing the query by the query handler 280 according to example embodiments. As shown in FIG. 5, the query handler 280 may repartition the pruned table 410 to at least one stream corresponding to a partition of the plurality of partitions 210 of the source table 201. For example, a row in the pruned table 410 may be repartitioned to a stream based on the reference partition identifier (e.g., a partition identifier) in the row. The query handler 280 may repartition the pruned table 410 to at least one stream using a repartitioning operator 404. The repartitioning operator 404 produces a plurality of streams or pipelines of records corresponding to each of the partitions of the source table 201. In other words, the repartitioning operator 404 distributes at least one row of the pruned table to a corresponding stream of the plurality of streams based on the reference partition identifier in the at least one row.

The plurality of streams may include a first stream 446 corresponding to the first partition 202, a second stream 444 corresponding to the second partition 204, and a third stream 442 corresponding to the third partition 206, among other streams. Repartitioning the pruned table 410 to the plurality of streams allows for the rows repartitioned to the streams to be joined to the corresponding partition of the source table 201.

Referring to the example pruned table 410 shown in FIG. 4, in FIG. 5, a first row of the pruned table 410 having a reference partition identifier associated with the third partition 206 has been repartitioned to a third stream 442 and a second row of the pruned table 410 having a reference partition identifier associated with the second partition 204 has been repartitioned to a second stream 444. Since no row remaining in the pruned table 410 has a reference partition identifier associated with the first partition 202, no row is repartitioned to the first stream 446. It should be appreciated that the plurality of streams may include any number of streams corresponding to a number of the plurality of partitions 210 of the source table 201.

Figure 6:
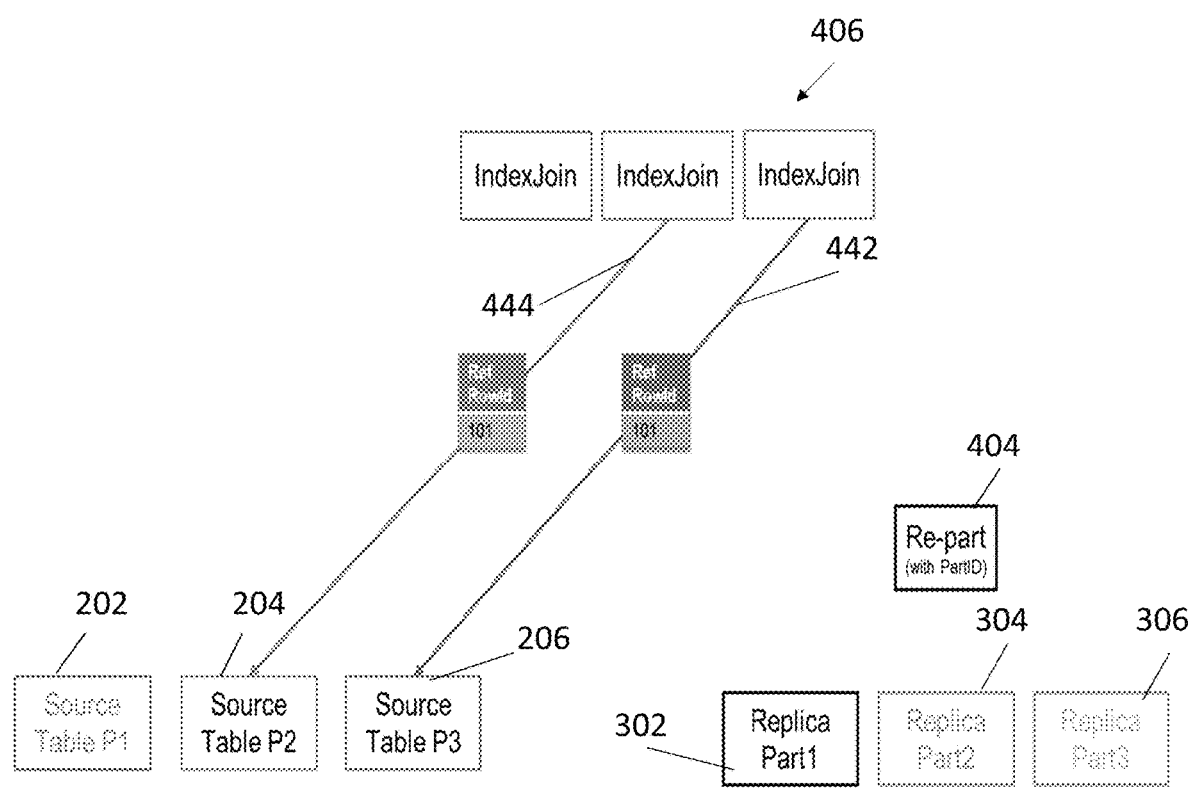
FIG. 6 depicts an example workflow for implementing a global index with a repartitioning operator, in accordance with some example embodiments.

FIG. 6 illustrates at least a part of the workflow 400 for processing the query by the query handler 280 according to example embodiments. As shown in FIG. 6, the query handler 280 may join the rows on the second stream 444 and the third stream 442 to the corresponding second partition 204 and third partition 206, respectively. The query handler 280 may join the rows on the streams with the source table 201 using a join operator 406, such as a semi-join operator, a partition-wise join operator, and/or the like. Joining the rows on the streams to the corresponding partitions of the source table 201 allows for the requested information to be retrieved from the source table 201 by only opening and/or accessing the relevant partitions of the source table 201, without accessing the unnecessary partitions of the source table 201. This helps to efficiently process the query and reduce computing resources required for executing the query.

Figure 7:
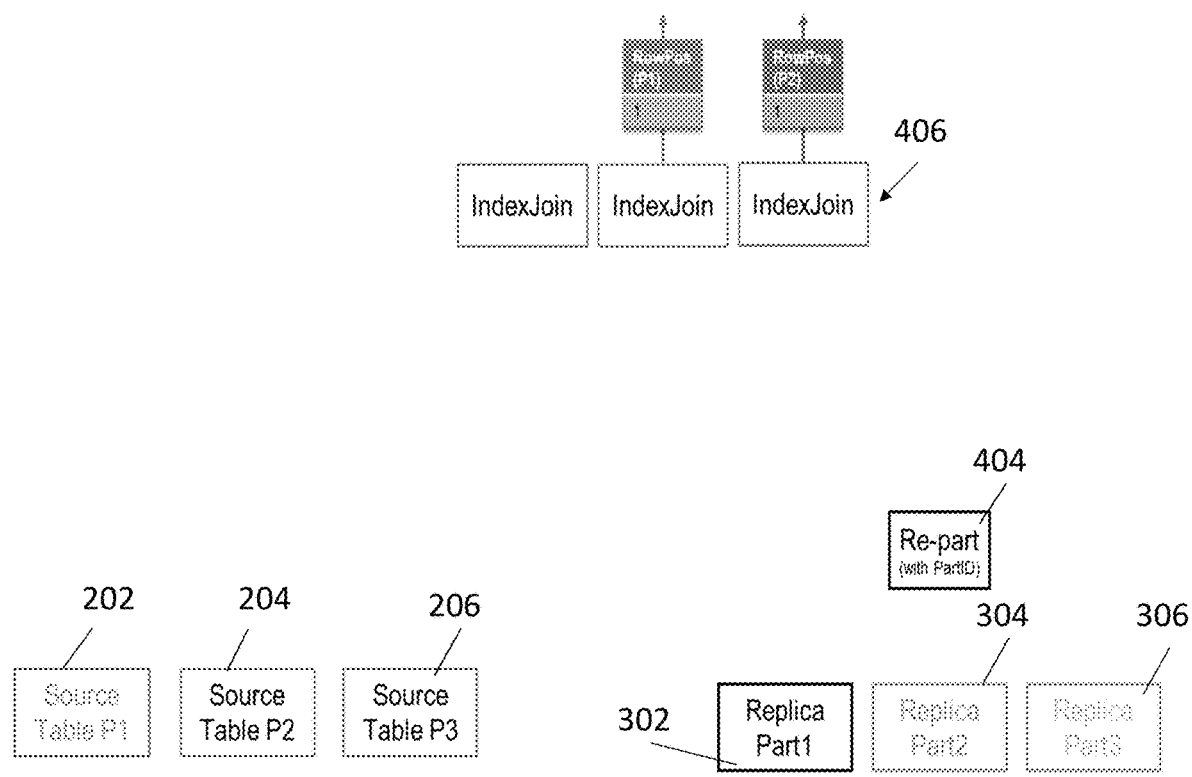
FIG. 7 depicts an example workflow for implementing a global index with a repartitioning operator, in accordance with some example embodiments.

The query handler 280 may join the rows on the streams with the corresponding partitions of the source table 201 based on the reference row identifier in rows that have been repartitioned to the corresponding streams. For example, the reference row identifier in the rows remaining after the pruning and repartitioning may be used by the query handler 280 to lookup, in the corresponding partition of the source table, the appropriate row having the row identifier identified by the reference row identifier. As shown in the example in FIG. 6, the reference row identifier 101 on the second stream 444 directs the query handler 280 to join and search the row in the second partition 204 having the row identifier 101 and the reference row identifier 101 on the third stream 442 directs the query handler 280 to join and search the row in the third partition 206 having the row identifier 101. As a result, as shown in FIG. 7, the relevant information associated with the searched rows can be retrieved and used for execution of the query by the query handler 280 and/or the execution engine 150.

Figure 8:
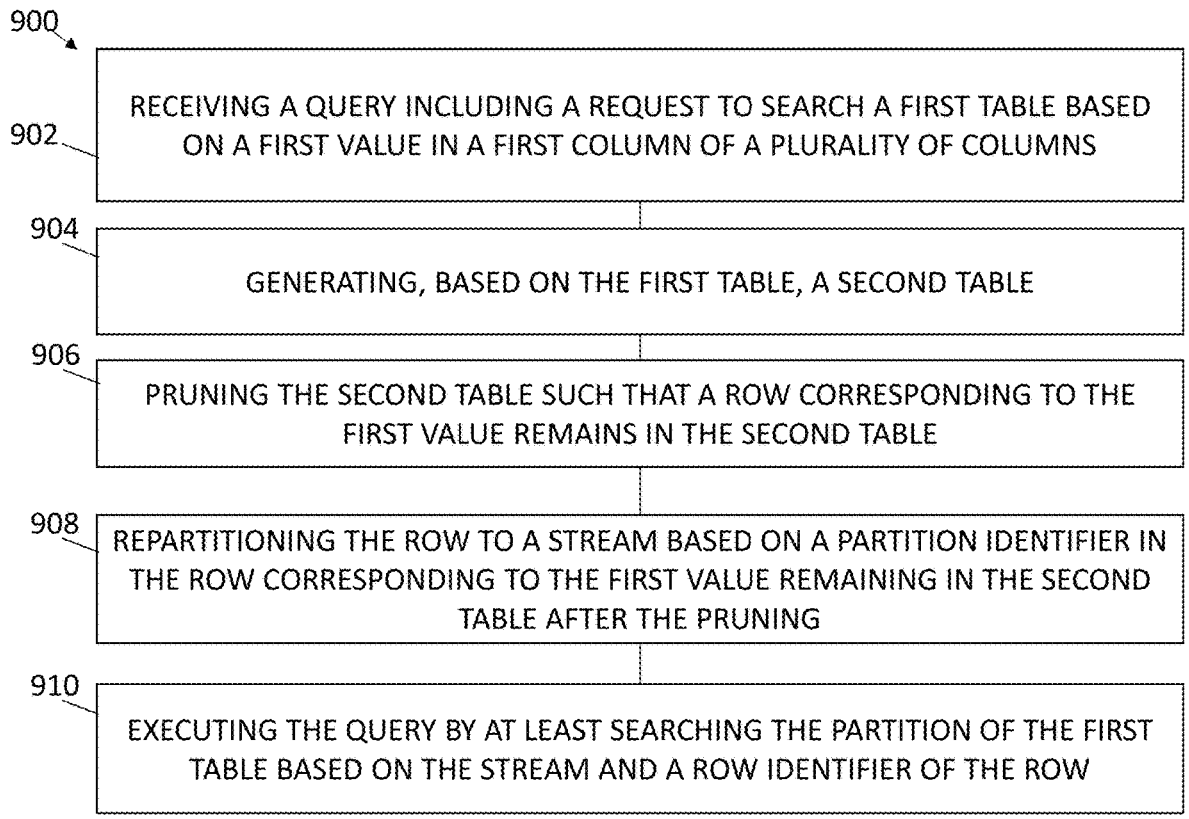
FIG. 8 depicts a flowchart illustrating a process for executing a query, in accordance with some example embodiments.

FIG. 8 depicts a flowchart illustrating a process 900 for processing queries using a global index with repartitioning operator, in accordance with some example embodiments. Referring to FIGS. 1-7, one or more aspects of the process 900 may be performed by the query handler 280, the execution engine 150, and/or another component of the database management system 100. As described herein, the database management system 100 helps to efficiently execute a query, such as when the query includes a request to select information from a partitioned source table based on at least one value that is not the partitioning key.

At 902, the database management system (e.g., the execution engine 150 and/or the query handler 280) may receive a query. The query may include a request to search a first table, such as the source table 201, based on a first value in a first column of a plurality of columns. The first table may include the plurality of columns (e.g., the plurality of columns 220), a plurality of rows (e.g., the plurality of rows 230), a plurality of partitions (e.g., the plurality of partitions 210) partitioned based on a second column (e.g., a partitioning key) of the plurality of columns, and a row identifier identifying each row of the plurality of rows. The plurality of partitions may include the partition, a second partition, a third partition, and so on. In some embodiments, the request to search the first table is further based on a second value, a third value, a fourth value, a fifth value, or the like, in the first column of the plurality of columns.

At 904, the database management system may generate a second table based on the first table. The second table may include an asymmetric replica (e.g., a global index), such as the asymmetric replica 300, of the first table. The second table may be generated on the fly during query execution. In some implementations, the second table is generated prior to execution of the query and/or query plan. In other words, while use of the second table may be part of the query plan, the generation of the second table may be performed prior to execution of the query. The second table may be generated by partitioning the second table based on the first column referenced by the query. The second table may additionally or alternatively be generated by including, in the second table, a partition identifier and a reference row identifier. The partition identifier and the reference row identifier may be included for each of the rows of each partition of the plurality of partitions in the second table. The partition identifier (e.g., the reference partition identifier described herein) may identify a partition of the plurality of partitions of the first table in which the first value is located. The reference row identifier (e.g., the reference row identifier described herein) may correspond to the row identifier from the first table. The partition identifier and/or the reference row identifier may thus refer back to the first table.

In embodiments in which multiple values, such as a second value, are included in the query the second table may be generated by further including, in the second table, a second partition identifier and a second reference row identifier. The second partition identifier may indicate a second partition of the plurality of partitions of the first table in which the second value is located. The second reference row identifier may correspond to the row identifier of a second row in which the second value is located in the first table.

At 906, the database management system may prune the second table. For example, the second table (e.g., the asymmetric replica) may be pruned such that a row corresponding to the first value remains in the second table. Additionally and/or alternatively, the second table may be pruned such that a second row corresponding to a second value included in the query remains in the second table. Thus, only the rows corresponding to the values included in the query may remain in the pruned second table. Pruning the second table may include removing rows from the second table that do not correspond to the at least one value included in the query.

At 908, the database management system may repartition the row to a stream based on the partition identifier in the row corresponding to the first value remaining in the second table after the pruning of the second table. In some embodiments in which the query includes a second value, the database management system may repartition the second row to a second stream based on the second partition identifier in the second row (or corresponding row) corresponding to the value remaining in the second table after the pruning of the second table. The row may be repartitioned to the stream using a repartition operator, as described herein, that distributes the row on a pipeline (e.g., the stream) based on the partition identifier (e.g., the reference partition identifier). This allows for the repartitioned rows to be joined to the first table to access the relevant information from the first table.

After the row is repartitioned, the row on the stream and the partition of the first table in which the value is located may be joined. For example, the row and the partition may be joined using a join operator, such as a semi-join operator or a partition-wise join. This allows for only the relevant partition of the first table to be searched without accessing the remaining partitions of the first table, improving efficiency and reducing computing resources for executing the query. In embodiments in which the second value is included in the query, the second row on the second stream of the plurality of streams may be joined to the second partition after the second row is repartitioned to the second stream. Again, this allows for only the partition (e.g., a first partition) and the second partition to be accessed without accessing the remaining partitions of the first table.

At 910, the database management system may execute the query by at least searching the partition of the first table based on the stream and a row identifier of the row that was repartitioned to the stream. In embodiments in which the second value is included in the query, the system may execute the query by further searching the second partition of the first table based on the second stream and the second row identifier of the second row that was repartitioned to the second stream. This allows for the system to search only the relevant partitions of the first table without accessing the remaining partitions. The system may look up and/or retrieve the relevant information associated with the values stored in the relevant partitions. The system may then execute the query and/or use the retrieved information for further processing and/or execution of the query plan.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: receiving a query including a request to search a first table based on a first value in a first column of a plurality of columns, wherein the first table comprises: the plurality of columns; a plurality of rows; a plurality of partitions partitioned based on a second column of the plurality of columns; and a row identifier identifying each row of the plurality of rows; generating, based on the first table, a second table, the generating comprising: partitioning the second table based on the first column; and including, in the second table, a partition identifier and a reference row identifier, wherein the partition identifier identifies a partition of the plurality of partitions of the first table in which the first value is located, and wherein the reference row identifier corresponds to the row identifier; pruning the second table such that a row corresponding to the first value remains in the second table; repartitioning the row to a stream based on the partition identifier in the row corresponding to the first value remaining in the second table after the pruning; and executing the query, the executing comprising searching the partition of the first table based on the stream and the row identifier of the row.

Example 2: The system of example 1, wherein the plurality of partitions comprises the partition and a second partition; and wherein the executing comprises searching only the partition of the first table in which the first value is located.

Example 3: The system of any one of examples 1 to 2, wherein the operations further comprise: joining, after the repartitioning, the row on the stream and the partition of the first table in which the first value is located.

Example 4: The system of example 3, wherein the joining is performed using a semi-join operator.

Example 5: The system of any one of examples 1 to 4, wherein the first table is a source table; and wherein the second table is an asymmetric replica of the first table.

Example 6: The system of any one of examples 1 to 5, wherein the query further includes the request to search the first table based on a second value in the first column of the plurality of columns.

Example 7: The system of example 6, wherein the generating further comprises: including, in the second table, a second partition identifier and a second reference row identifier, wherein the second partition identifier indicates a second partition of the plurality of partitions of the first table in which the second value is located, and wherein the second reference row identifier corresponds to the row identifier of a second row in which the second value is located; and wherein the second table is further pruned such that the row and the second row remains in the second table.

Example 8: The system of example 7, wherein the second row is repartitioned to a second stream based on the second partition identifier; wherein the second row on the second stream is joined, after the second row is repartitioned to the second stream, to the second partition of the plurality of partitions of the first table; and wherein the executing comprises searching only the partition of the first table in which the first value is located and the second partition of the first table in which the second value is located.

Example 9: The system of any one of examples 1 to 8, wherein the second column is a partitioning key.

Example 10: A computer-implemented method, comprising: receiving a query including a request to search a first table based on a first value in a first column of a plurality of columns, wherein the first table comprises: the plurality of columns; a plurality of rows; a plurality of partitions partitioned based on a second column of the plurality of columns; and a row identifier identifying each row of the plurality of rows; generating, based on the first table, a second table, the generating comprising: partitioning the second table based on the first column; and including, in the second table, a partition identifier and a reference row identifier, wherein the partition identifier identifies a partition of the plurality of partitions of the first table in which the first value is located, and wherein the reference row identifier corresponds to the row identifier; pruning the second table such that a row corresponding to the first value remains in the second table; repartitioning the row to a stream based on the partition identifier in the row corresponding to the first value remaining in the second table after the pruning; and executing the query, the executing comprising searching the partition of the first table based on the stream and the row identifier of the row.

Example 11: The method of example 10, wherein the plurality of partitions comprises the partition and a second partition; and wherein the executing comprises searching only the partition of the first table in which the first value is located.

Example 12: The method of any one of examples 10 to 11, further comprising: joining, after the repartitioning, the row on the stream and the partition of the first table in which the first value is located.

Example 13: The method of example 12, wherein the joining is performed using a semi-join operator.

Example 14: The method of any one of examples 11 to 13, wherein the first table is a source table; and wherein the second table is an asymmetric replica of the first table.

Example 15: The method of any one of examples 10 to 14, wherein the query further includes the request to search the first table based on a second value in the first column of the plurality of columns.

Example 16: The method of example 15, wherein the generating further comprises: including, in the second table, a second partition identifier and a second reference row identifier, wherein the second partition identifier indicates a second partition of the plurality of partitions of the first table in which the second value is located, and wherein the second reference row identifier corresponds to the row identifier of a second row in which the second value is located; and wherein the second table is further pruned such that the row and the second row remains in the second table.

Example 17: The method of example 16, wherein the second row is repartitioned to a second stream based on the second partition identifier; wherein the second row on the second stream is joined, after the second row is repartitioned to the second stream, to the second partition of the plurality of partitions of the first table; and wherein the executing comprises searching only the partition of the first table in which the first value is located and the second partition of the first table in which the second value is located.

Example 18: The method of any one of examples 10 to 17, wherein the second column is a partitioning key.

Example 19: A non-transitory computer-readable medium storing instructions, which when executed by at least one data processor, result in operations comprising: receiving a query including a request to search a first table based on a first value in a first column of a plurality of columns, wherein the first table comprises: the plurality of columns; a plurality of rows; a plurality of partitions partitioned based on a second column of the plurality of columns; and a row identifier identifying each row of the plurality of rows; generating, based on the first table, a second table, the generating comprising: partitioning the second table based on the first column; and including, in the second table, a partition identifier and a reference row identifier, wherein the partition identifier identifies a partition of the plurality of partitions of the first table in which the first value is located, and wherein the reference row identifier corresponds to the row identifier; pruning the second table such that a row corresponding to the first value remains in the second table; repartitioning the row to a stream based on the partition identifier in the row corresponding to the first value remaining in the second table after the pruning; and executing the query, the executing comprising searching the partition of the first table based on the stream and the row identifier of the row.

Example 20: The non-transitory computer readable medium of example 19, wherein the plurality of partitions comprises the partition and a second partition; and wherein the executing comprises searching only the partition of the first table in which the first value is located.

FIG. 9 depicts an example of a database management system 100, in accordance with some example implementations.

The database management system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 9, the databases 190A-N represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-N, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-N. Specifically, the TableScan operator at Table 1 would result in a call for a dictionary look up for a column "X" for the value ID of "1" and an indexvector scan with a valueid obtained from the dictionary look up, which results in a document ID list that identifies one or more rows in the table 1. Then for each document ID, a call is made via 199 to look up the value IDs for columns A and B. The value IDs may be used to look up dictionary values to materialize, the columns A and B including the actual data values for those columns.

TABLE 1

| Operator | Calls made on Database API |
| --- | --- |
| 1) TableScan (Filter X = 1) | dictionary lookup column "X" for the value of ID of "1" indexvector scan with a valueid from the lookup, which results in a document ID (docid) list that identifies one or more rows in table "1". |
| 2) Materialization (Columns A, B) | For each docid, lookup value IDs (valueids) for columns A + B For the valueids, lookup dictionary value in dictionaries of A and B |

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example embodiments, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution. Furthermore, the query execution engine 150 may provide the ability to access table storage via an abstract interface to a table adapter, which may reduce dependencies on specific types of storage/persistence layers (which may enable use with different types of storage/persistence layers).

In some example embodiments, the database execution engine 150 may be provided with at least one table adapter. In some example embodiments, the table adapter may generate an object, such as a table object, which can be stored in cache with other code, objects, and/or the like awaiting runtime execution of the query. In some example embodiments, and the table object can be opened, during query execution, to provide access to a table stored in the persistence layer of a database.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system, comprising:
   at least one data processor; and
   at least one memory storing instructions that when executed by the at least one data processor result in operations comprising:
   receiving a query including a request to search a first table based on a first value in a first column of a plurality of columns, wherein the first table comprises: the plurality of columns; a plurality of rows; a plurality of partitions partitioned based on a second column of the plurality of columns; and a row identifier identifying each row of the plurality of rows;
   generating, based on the first table, a second table, the generating comprising:
     partitioning the second table based on the first column; and
     including, in the second table, a first partition identifier and a first reference row identifier, wherein the first partition identifier identifies a first partition of the plurality of partitions of the first table in which the first value is located, and wherein the first reference row identifier corresponds to a first row identifier of a first row of the first table in which the first value is located;
   pruning the second table such that a first row of the second table corresponding to the first value remains in the second table;
   repartitioning the first row of the second table to a first stream based on the first partition identifier, wherein the first stream corresponds to the first partition of the first table in which the first value is located; and executing the query, the executing comprising searching the first partition of the first table based on the first stream and the first row identifier of the first row of the first table.

2. The system of claim 1, wherein the plurality of partitions comprises the first partition and a second partition; and wherein the executing comprises searching only the first partition of the first table in which the first value is located.

3. The system of claim 1, wherein the operations further comprise:

joining, after the repartitioning, the first row on the first stream and the first partition of the first table in which the first value is located.

4. The system of claim 3, wherein the joining is performed using a semi-join operator.

5. The system of claim 1, wherein the first table is a source table; and wherein the second table is an asymmetric replica of the first table.

6. The system of claim 1, wherein the query further includes the request to search the first table based on a second value in the first column of the plurality of columns.

7. The system of claim 6, wherein the generating further comprises: including, in the second table, a second partition identifier and a second reference row identifier, wherein the second partition identifier indicates a second partition of the plurality of partitions of the first table in which the second value is located, and wherein the second reference row identifier corresponds to a second row identifier of a second row of the first table in which the second value is located; and wherein the second table is further pruned such that the first row and a second row of the second table remain in the second table.

8. The system of claim 7, wherein the second row of the second table is repartitioned to a second stream based on the second partition identifier; wherein the second row on the second stream is joined, after the second row is repartitioned to the second stream, to the second partition of the plurality of partitions of the first table; and wherein the executing comprises searching only the first partition of the first table in which the first value is located and the second partition of the first table in which the second value is located.

9. The system of claim 1, wherein the second column is a partitioning key.

10. A computer-implemented method, comprising:

receiving a query including a request to search a first table based on a first value in a first column of a plurality of columns, wherein the first table comprises: the plurality of columns; a plurality of rows; a plurality of partitions partitioned based on a second column of the plurality of columns; and a row identifier identifying each row of the plurality of rows;

generating, based on the first table, a second table, the generating comprising:

partitioning the second table based on the first column; and including, in the second table, a first partition identifier and a first reference row identifier, wherein the first partition identifier identifies a first partition of the plurality of partitions of the first table in which the first value is located, and wherein the first reference row identifier corresponds to a first row identifier of a first row of the first table in which the first value is located;

pruning the second table such that a first row of the second table corresponding to the first value remains in the second table;

repartitioning the first row of the second table to a first stream based on the first partition identifier, wherein the first stream corresponds to the first partition of the first table in which the first value is located; and executing the query, the executing comprising searching the first partition of the first table based on the first stream and the first row identifier of the first row of the first table.

11. The method of claim 10, wherein the plurality of partitions comprises the first partition and a second partition; and wherein the executing comprises searching only the first partition of the first table in which the first value is located.

12. The method of claim 10, further comprising: joining, after the repartitioning, the first row on the first stream and the first partition of the first table in which the first value is located.

13. The method of claim 12, wherein the joining is performed using a semi join operator.

14. The method of claim 10, wherein the first table is a source table; and wherein the second table is an asymmetric replica of the first table.

15. The method of claim 10, wherein the query further includes the request to search the first table based on a second value in the first column of the plurality of columns.

16. The method of claim 15, wherein the generating further comprises: including, in the second table, a second partition identifier and a second reference row identifier, wherein the second partition identifier indicates a second partition of the plurality of partitions of the first table in which the second value is located, and wherein the second reference row identifier corresponds to a second the row identifier of a second row of the first table in which the second value is located; and wherein the second table is further pruned such that the first row and the second row of the second table remain in the second table.

17. The method of claim 16, wherein the second row of the second table is repartitioned to a second stream based on the second partition identifier; wherein the second row on the second stream is joined, after the second row is repartitioned to the second stream, to the second partition of the plurality of partitions of the first table; and wherein the executing comprises searching only the first partition of the first table in which the first value is located and the second partition of the first table in which the second value is located.

18. The method of claim 10, wherein the second column is a partitioning key.

19. A non-transitory computer-readable medium storing instructions, which when executed by at least one data processor, result in operations comprising:

receiving a query including a request to search a first table based on a first value in a first column of a plurality of columns, wherein the first table comprises: the plurality of columns; a plurality of rows; a plurality of partitions partitioned based on a second column of the plurality of columns; and a row identifier identifying each row of the plurality of rows;

generating, based on the first table, a second table, the generating comprising:

partitioning the second table based on the first column; and including, in the second table, a first partition identifier and a first reference row identifier, wherein the first partition identifier identifies a first partition of the plurality of partitions of the first table in which the first value is located, and wherein the first reference row identifier corresponds to a first row identifier of a first row of the first table in which the first value is located;

pruning the second table such that a first row of the second table corresponding to the first value remains in the second table;

repartitioning the first row of the second table to a first stream based on the first partition identifier, wherein the first stream corresponds to the first partition of the first table in which the first value is located; and executing the query, the executing comprising searching the first partition of the first table based on the first stream and the first row identifier of the first row of the first table.

20. The non-transitory computer readable medium of claim 19, wherein the plurality of partitions comprises the first partition and a second partition; and wherein the executing comprises searching only the first partition of the first table in which the first value is located.

\* \* \* \* \*